Oct. 2, 1951  J. B. LEECE ET AL  2,569,679
APPARATUS FOR WINDING ELECTRICAL COILS
Filed Nov. 27, 1948  9 Sheets-Sheet 1

FIG. 1

INVENTORS
JOHN B. LEECE
BY NATHAN P. HARMON
Hudson, Boughton,
Williams, David & Hoffmann.
ATTORNEYS Oct. 2, 1951      J. B. LEECE ET AL      2,569,679
APPARATUS FOR WINDING ELECTRICAL COILS Filed Nov. 27, 1948      9 Sheets-Sheet 3

INVENTORS
JOHN B. LEECE
BY NATHAN P. HARMON
Hudson, Boughton,
Williams, David & Hoffmann.
ATTORNEYS

Fig. 4

INVENTORS
JOHN B. LEECE
NATHAN P. HARMON
BY Hudson, Boughton,
Williams, David & Hoffmann
ATTORNEYS Oct. 2, 1951  J. B. LEECE ET AL  2,569,679
APPARATUS FOR WINDING ELECTRICAL COILS
Filed Nov. 27, 1948  9 Sheets-Sheet 6

INVENTORS
JOHN B. LEECE
BY NATHAN P. HARMON
Hudson, Boughton,
Williams, David & Hoffmann.
ATTORNEYS

Oct. 2, 1951           J. B. LEECE ET AL           2,569,679
APPARATUS FOR WINDING ELECTRICAL COILS
Filed Nov. 27, 1948           9 Sheets-Sheet 8

INVENTORS
JOHN B. LEECE
NATHAN P. HARMON
BY Hudson, Boughton,
Williams, David & Hoffmann.
ATTORNEYS Oct. 2, 1951      J. B. LEECE ET AL      2,569,679
APPARATUS FOR WINDING ELECTRICAL COILS
Filed Nov. 27, 1948      9 Sheets-Sheet 9

INVENTORS
JOHN B. LEECE
NATHAN P. HARMON
BY Hudson, Boughton,
Williams, David & Hoffmann.
ATTORNEYS Patented Oct. 2, 1951

2,569,679

UNITED STATES PATENT OFFICE 2,569,679

APPARATUS FOR WINDING ELECTRICAL COILS

John B. Leece, University Heights, and Nathan P. Harmon, Cleveland, Ohio, assignors to The Leece-Neville Company, Cleveland, Ohio, a corporation of Ohio Application November 27, 1948, Serial No. 62,394

11 Claims. (Cl. 242—1)

This invention relates to the winding of wire into electrical coils and, more particularly, to a novel apparatus for winding a wire coil in place on a core member.

An object of the present invention is to provide a novel apparatus by which a wire coil can be wound on a core member in a more rapid and satisfactory manner than has been possible heretofore.

Another object of the invention is to provide a novel apparatus by which a wire coil, such as a field coil, can be wound on an internal pole projection or the like of a hollow magnet frame in a more rapid and satisfactory manner than has been possible heretofore.

A further object is to provide a novel coil winding apparatus in which a relative reciprocating movement and a relative oscillating movement are produced in timed relation between a workholder carrying a core member and a wire-feeding guide for winding the wire around the core member.

Still another object is to provide a novel coil winding apparatus for use with a core member having an opening therein and a pole element projecting into such opening and in which the relative reciprocating and relative oscillating movements cause the wire-feeding guide to pass through said opening and wind the wire around the pole element.

As another of its objects this invention provides novel apparatus for winding a coil on a core member in which a workholder for the core member is reciprocably movable and a wire-feeding guide is adapted for oscillation transversely to the path of the reciprocable movement and in timed relation thereto.

Yet another object is to provide novel coil winding apparatus of the character mentioned, in which the wire-feeding guide is an arm carried by a stem which is rockable about an axis extending substantially in the direction of the reciprocating movement of the workholder.

Still another object is to provide a coil winding apparatus of this character in which the workholder is adapted to receive a magnet frame having an opening therein and a pole member extending into such opening, and the reciprocating movement of the workholder causes the wire-feeding guide to pass through the frame opening and the oscillation of the guide transversely of, and in timed relation to, the reciprocating movement causes the wire to be wound around the pole member.

It is also an object of this invention to provide coil winding apparatus of the character mentioned in which the workholder comprises sections which are relatively movable for holding or releasing the work and the reciprocating movement of the workholder is toward and away from a loading and unloading station and in which actuating means at said station is adapted to be rendered effective on the workholder for releasing the work.

As a further object this invention provides apparatus for winding coils on a pair of internal pole members which are spaced apart a given angular distance in a hollow magnet frame by causing relative reciprocating and relative oscillating movement between the magnet frame and a wire-feeding guide having wire-feeding arms spaced apart said given angular distances such that the guide passes through the frame opening and the arms thereof travel around the pole members for winding the coils thereon.

Other objects and advantages of the invention will be apparent in the following detailed description and in the accompanying sheets of drawings in which.

The accompanying drawings show one embodiment of the improved coil winding machine 10 which will now be described in greater detail. The improved machine is provided with a suitable frame 11 on which the various parts are mounted. The frame 11 may comprise an upright structure formed principally of metal bars, such as angle irons, and having pairs of upright legs 12 and 13 at the right and left ends thereof. The frame also includes a plurality of substantially horizontally extending plate members 14, 15, 16 and 17 located at different elevations and on which various parts of the apparatus are mounted, as explained in greater detail hereinafter.

In addition to the frame 11 the improved machine 10 comprises, in general, a main drive shaft 18, a reciprocably movable workholder 19 and an oscillating wire-feeding guide 20. A workpiece 21 is shown in place in the workholder 19 in Figs. 7, 8 and 11 and, before proceeding further with the detailed description of the machine, it is considered advisable to briefly describe the workpiece on which the coil winding operations are to be performed.

Figure 16:
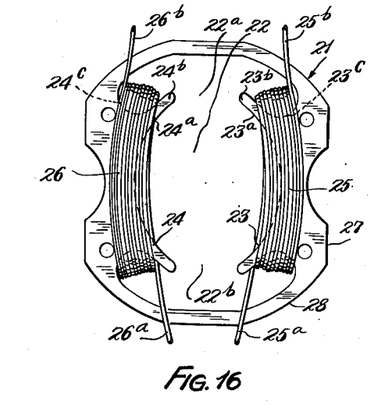
Fig. 16 is a plan view showing, as an example of a workpiece, a laminated motor frame having field coils which have been wound in place therein by the method and apparatus of this invention.

The workpiece 21 is here shown (Figs. 16 and 17) as being a core member for an electromagnet and, although the machine is adaptable to coil winding operations on various forms of core members, the workpiece shown in this instance is a laminated frame for a small electric motor. The workpiece 21 can be further described as being a hollow magnet frame having an opening 22 extending therethrough and into which a pair of opposed pole members 23 and 24 project. The pole members 23 and 24, which in this instance are the field poles of the electric motor, are integral portions of the magnet frame and have concave pole faces 23a and 24a located on diametrically opposite sides of the opening 22 and between which an armature or the like is adapted to be rotatably received. The pole members 23 and 24 extend for the full height or thickness of the stack of laminations constituting the frame 21 and have pole tips 23b and 24b thereon at opposite sides thereof. The raised pole tips 23b and 24b are spaced apart by intervening spaces or slots 22a and 22b which communicate with the frame opening 22 at its opposite sides as seen in Fig. 16. The pole members 23 and 24 have undercut recesses 23c and 24c extending thereacross and located adjacent the pole tips 23b and 24b so that the tips of each pole form a pair of hook-like portions behind which the field coils can be wound.

Figure 17:
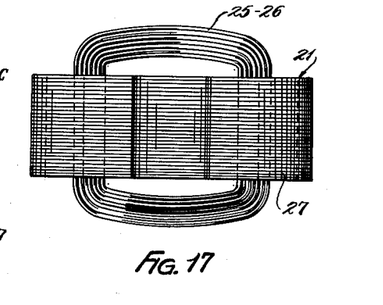
Fig. 17 is a side elevation of such motor frame.

The magnet frame 21 is shown in Figs. 16 and 17 as having field coils 25 and 26 thereon in surrounding relation to the poles 23 and 24. The field coils 25 and 26 have been wound in place on the poles 23 and 24 by the improved machine 10 and the method accomplished thereby. These field coils extend around the poles so as to lie in the undercut recesses 23c and 24c and are retained in place by the pairs of hook-like pole tips 23b and 24b. The opposite ends of the coil 25 extend outwardly therefrom in the form of the wire leads 25a and 25b and, similarly, wire leads 26a and 26b extend outwardly from opposite ends of the coil 26.

At the conclusion of the coil winding operation performed by the machine 10, the coils 25 and 26 extend around the poles 23 and 24 in substantially the position shown in Fig. 16 and may overlap to some extent the pole faces 23a and 24a which define the arcuate sides of the frame opening 22. This is immaterial, however, because these coils are subjected to a subsequent forming operation by which they will be curved outwardly away from the opening 22 so that an armature can be mounted in the latter. As here shown, the workpiece 21 may also have a pair of substantially flat outer side faces 27 thereon and a pair of convexly curved outer side faces 28 with which certain portions of the workholder 19 cooperate as will be presently explained.

Figure 11:
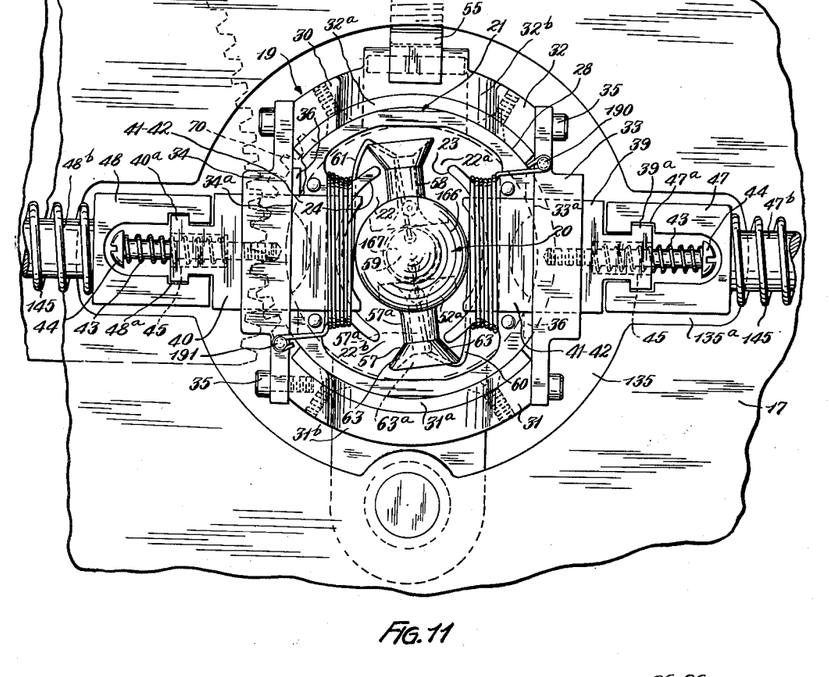
Fig. 11 is a fragmentary plan view of the workholder when located substantially at the upper end of its travel and viewed as indicated by line 11—11 of Fig. 7 and with a magnet frame therein having pole members on which field coils are being wound.

The workholder 19 is of a sectional construction and includes a hollow metal body 30 having a pair of upright integral arcuate front and back walls 31 and 32 between which the workpiece 21 is received, as shown in Fig. 11. The front and back walls 31 and 32 are provided at the inside thereof with hardened arcuate inserts 31a and 32a which are engaged by the convex outer side faces 28 of the workpiece. The workholder 19 also includes a pair of side plates 33 and 34 located in inwardly facing opposed relation and attached to edge portions of the front and back walls 31 and 32 by means of screws 35. The inner faces 33a and 34a of these side plates form the side walls of the cavity 30a of the workholder and are engaged by the flat outer side faces 27 of the workpiece 21.

Each of the side plates 33 and 34 also carries a pair of inwardly projecting lugs or shoulders 36 forming rests for supporting the workpiece 21. These inwardly projecting shoulders 36 form four such rests disposed in a substantially quadrangular plan relation, as shown in Fig. 11, and support the workpiece at four correspondingly located points. The upright front and rear arcuate walls 31 and 32 of the workholder 19 are also provided with recesses 31b and 32b extending downwardly thereinto from the tops thereof and which form clearance recesses for the fingers of a person operating the machine. These clearance recesses 31b and 32b permit the operator's fingers to grasp the workpiece at substantially diametrically opposed points for removing the same from the workholder after the coils 25 and 26 have been wound thereon. Each of the side plates 33 and 34 is further provided with a pair of vertically spaced substantially laterally extending slots 37 and 38 (see Fig. 7) which communicate with the cavity 30a of the workholder.

Figure 7:
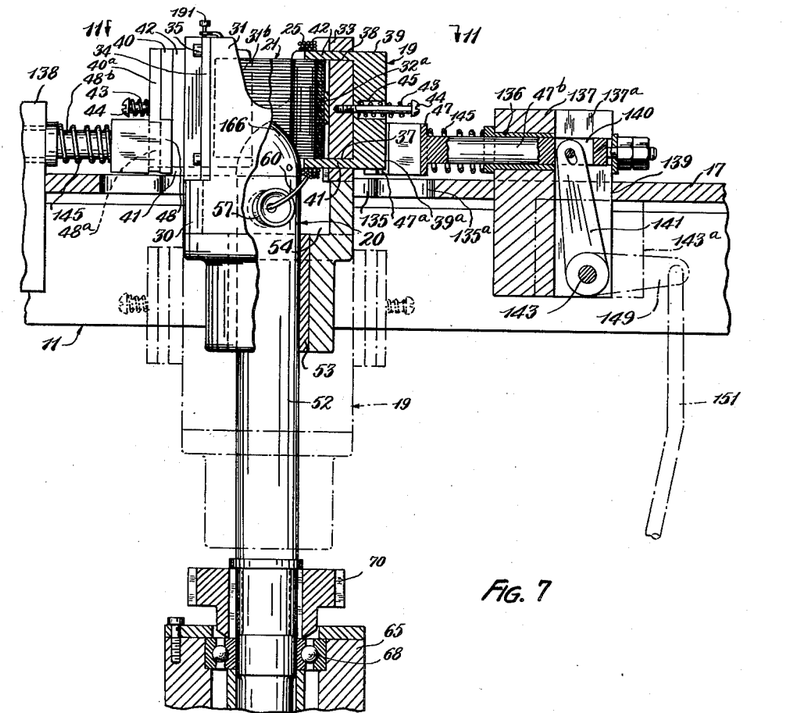
Fig. 7 is a fragmentary vertical section taken substantially as indicated by section line 7—7 of Fig. 2 but with the workholder at the loading and unloading station at the upper end of its reciprocating travel.

The workholder 19 also includes a pair of fork members 39 and 40 which are associated with the respective side plates 33 and 34. Each of these fork members has a pair of vertically spaced arms 41 and 42 which extend inwardly through the paired slots 37 and 38. The pairs of slots 37 and 38 are so located in the side plates 33 and 34 with respect to the shoulders 36 that the arms 41 and 42 of the fork members 39 and 40 will straddle the workpiece 21, as shown in Figs. 7 and 11. The fork members thus constitute holding or locking members which retain the workpiece 21 in the cavity 30a of the workholder 19.

The fork members 39 and 40 are normally urged in an inward direction by compression springs 43 so as to extend the arms 41 and 42 into the cavity of the workholder simultaneously and from opposite sides thereof. The springs 43 are here shown as being mounted on screws 44 which are carried by the side plates 33 and 34 and extend through openings provided in the fork members 39 and 40. The springs 43 have their outer ends in engagement with the heads of the screws 44 and their inner ends pressing against spring seats formed by the bottoms of recesses 45 which extend into the fork member. The fork members 39 and 40 are movable substantially radially of the workholder 19 and when they have been expanded outwardly to substantially the position shown in Fig. 8, the arms 41 and 42 thereof will have been withdrawn from the workholder cavity 30a and the workpiece 21 is then free to be lifted out of the workholder by the operator.

Figure 8:
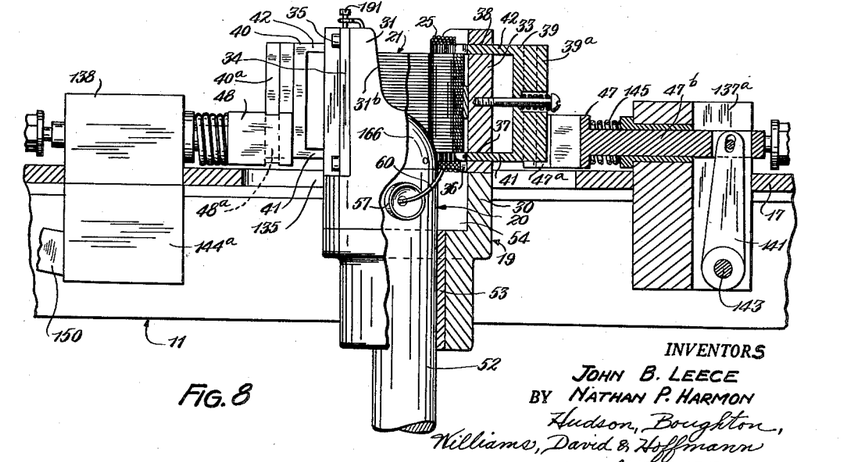
Fig. 8 is a similar fragmentary vertical section but showing the workholder in an expanded condition for releasing the work.

To provide for such outward movement of the fork members 39 and 40 in opposition to the springs 43, these members are constructed with key-shaped projections or heads 39a and 40a thereon at their outer ends, as shown in Fig. 11, and with which a pair of actuators 47 and 48 are adapted to cooperate. The actuators 47 and 48 have dovetail slots 47a and 48a therein in which the heads 39a and 40a of the fork members 39 and 40 engage to provide an operating connection between the actuators and the fork members. When this operating connection has been established in the manner explained hereinafter and as shown in Figs. 7, 8 and 11, the actuators 47 and 48 can apply an outward pulling force to the fork members 39 and 40 for retracting the same to their work releasing position shown in Fig. 8.

As indicated above in a general way, the workholder 19 is reciprocably movable during the coil winding operation and carries the workpiece 21 with it during such reciprocating movement. In the apparatus herein disclosed the reciprocating movement of the workholder 19 is a vertical reciprocating movement and during this reciprocating movement is guided by a fixed upright guide rod 50. For cooperation with the guide rod 50 the body 30 of the workholder is provided with a laterally extending arm 51 having a bushing 51a therein which is slidable on the guide rod. The workholder 19 is also supported and guided in part by an upright cylindrical stem 52 which constitutes a part of the wire-feeding guide 20 to be described hereinafter. The body 30 of the workholder has a bushing 53 mounted therein and which is slidable on the upright stem 52. For imparting the above-mentioned vertical reciprocating movement to the workholder 19, the body 30 thereof is provided with a rack 55 with which a driving gear 56 meshes.

It can well be explained at this point that the body 30 of the workholder 19 is provided with a clearance chamber 54 which accommodates the wire-feeding guide 20 at certain times during the winding operation as will be explained hereinafter. The clearance chamber 54 is located below the work supporting shoulders 36 and constitutes a downward continuation of the cavity 30a of the workholder.

Figure 6:
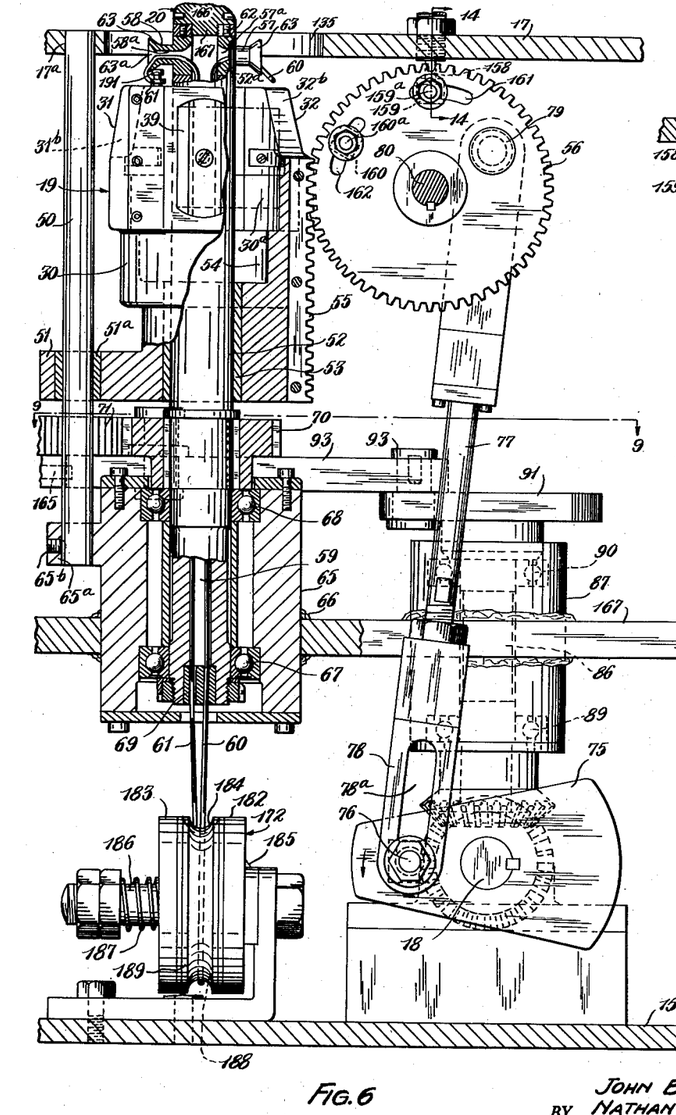
Fig. 6 is a partial vertical section taken on section line 6—6 of Figs. 1, 2 and 4.

The wire-feeding guide 20 comprises the above-mentioned vertical stem 52 and a pair of hollow guide arms 57 and 58 mounted thereon adjacent its upper end and extending in substantially diametrically opposed laterally projecting relation, as shown in Figs. 6 and 11. The stem 52 has a central passage 59 therein through which a pair of wires 60 and 61 are adapted to be supplied to the guide arms 57 and 58 for feeding by the latter to the pole members 23 and 24 of the workpiece 21 during the winding of the coils 25 and 26 thereon. The arms 57 and 58 are suitably mounted on the stem 52 so that their passages 57a and 58a will communicate with the central passage 59 to receive the wires 60 and 61 therefrom.

In the embodiment of the invention here illustrated the hollow guide arms 57 and 58 are mounted on the stem 52 by having block-shaped base portions 52a engaged in side openings of the stem and retained therein by the setscrew 62. At the outer end thereof each of the guide arms 57 and 58 is provided with a substantially bell-shaped head 63 having an outwardly flared recess 63a therein. The recesses 63a constitute the outer ends of the wire-feeding passages 57a and 58a. The portions of the arms 57 and 58 extending between their block shaped bases 52a and their bell-shaped heads 63 constitute necks 57b and 58b of relatively reduced size through which the passages 57a and 58a extend.

Figure 3:
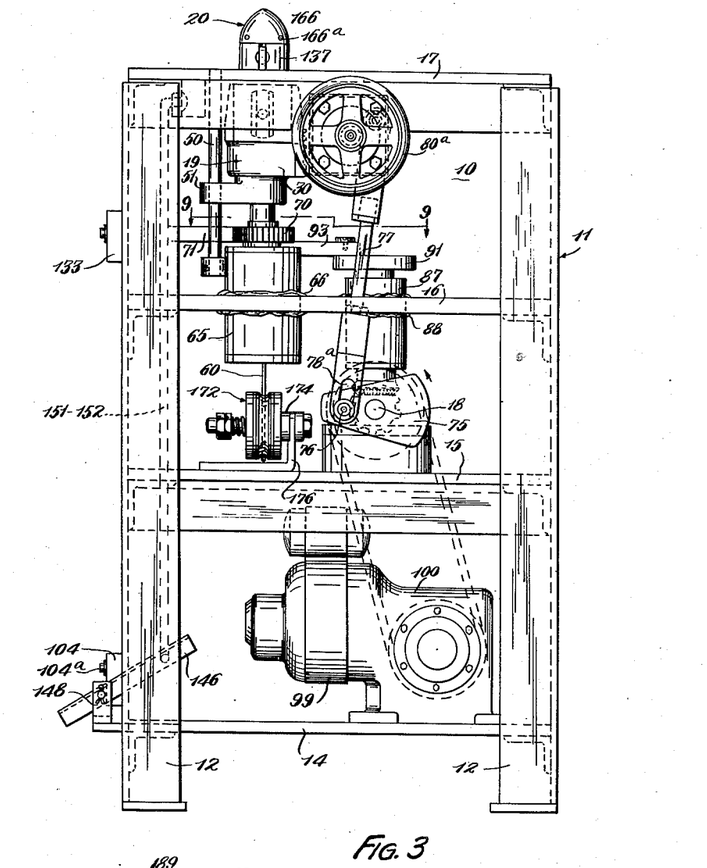
Fig. 3 is an elevation of the right-hand end of the machine.
Figure 4:
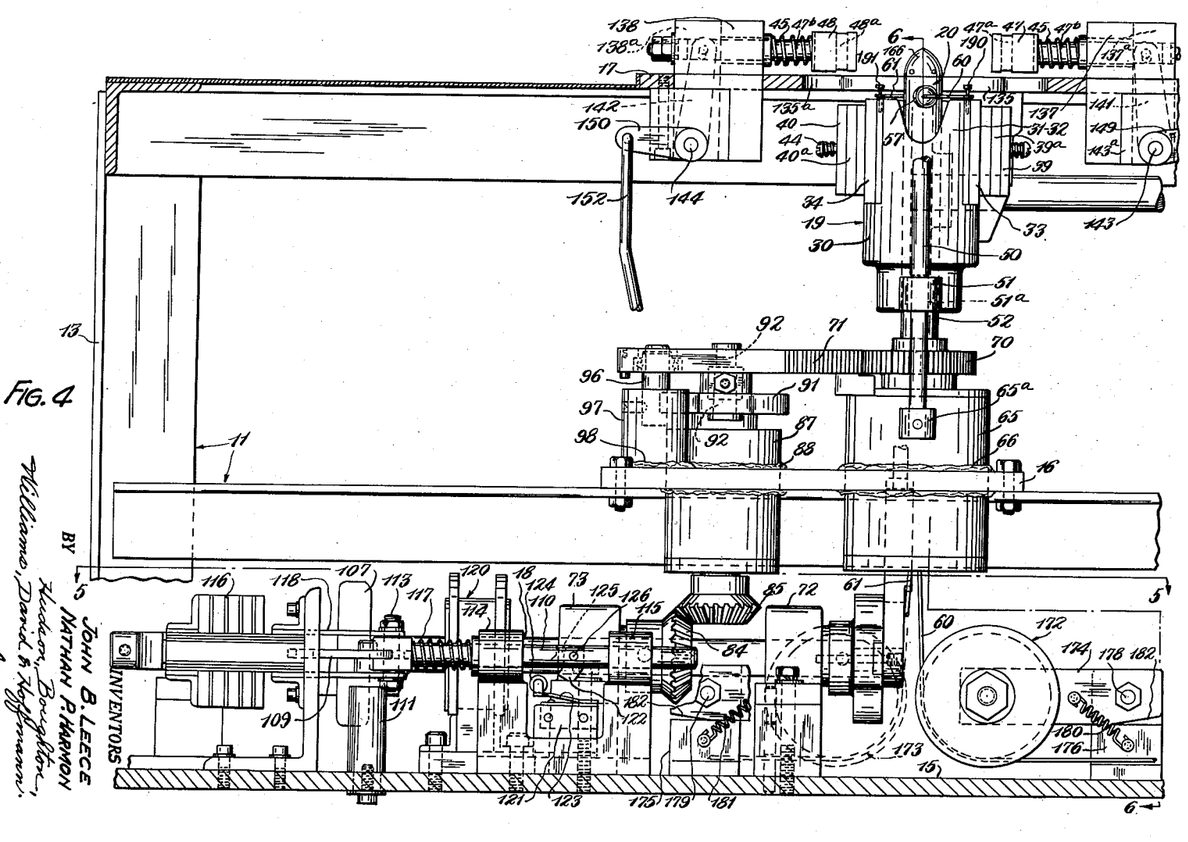
Fig. 4 is a partial vertical section taken substantially on section line 4—4 of Fig. 2 and showing certain mechanism of the machine on a larger scale.

The wire-feeding guide 20 is adapted for oscillating movement which is imparted thereto in timed relation to the vertical reciprocating movement of the workholder 19. For this purpose the upright stem 52 is supported by and journalled in an upright bearing sleeve 65. The bearing sleeve 65 is mounted on the plate 16 of the frame 11 and, as shown in Figs. 3, 4 and 6, extends through this plate and is connected thereto by the welding 66. The lower portion of the stem 52 is mounted in the bearing sleeve 65 by the vertically spaced anti-friction bearings 67 and 68 (see Fig. 6). The lower end of the stem 52 is provided with a recess in which a guide bushing 69 is mounted. This bushing has guide passages therein through which the wires 60 and 61 extend. The above-mentioned fixed guide rod 50 has its lower end secured in an arm 65a of the bearing sleeve 65 as by means of the setscrew 65b and has its upper end engaged in an opening 17a of the plate 17.

During the coil winding operation, vertical reciprocating movement is imparted to the workholder 19 by the gear 56, as mentioned above, and during this movement the workholder moves relative to the wire-feeding guide 20 so that the latter passes relatively through the opening 22 of the workpiece in the manner of a needle during a sewing operation. During this relative passage of the wire-feeding guide 20 through the opening of the workpiece, the wire-feeding arms 57 and 58 function somewhat in the manner of the eye of the needle since they carry the wires 60 and 61 back and forth during the winding thereof around the pole members 23 and 24. In order to have the arms 57 and 58 of the guide 20 move through the opening 22 of the workpiece 21, these arms must be relatively short as shown in Fig. 11, and the reduced necks 57b and 58b thereof should be only long enough to locate the bell-shaped heads 63 generally outwardly of the pairs of pole tips 23b and 24b.

The oscillating movement of the wire-feeding guide 20 constitutes a back and forth rotary or rocking movement of the stem 52 in the bearings 67 and 68 which causes an arcuate back and forth swinging movement of the wire-feeding arms 57 and 58 transversely to the direction of the reciprocating travel of the workholder 19. The rocking movement is imparted to the stem 52 by means of a gear 70 keyed thereto and a gear sector 71 meshing therewith. The oscillating movement of the wire-feeding guide 20 is imparted thereto at the ends of the reciprocating travel of the workholder 19 and only while the workholder is stationary at the ends of such reciprocating travel. Similarly, the reciprocating movement of the workholder 19 is imparted thereto at the ends of the oscillating movement of the wire-feeding guide 20 and only while the guide is in its stationary position with the wire-feeding arms 57 and 58 located in a position to pass through the slots 22a and 23a between the pairs of pole tips 23b and 24b.

Fig. 6 shows the workholder 19 in its lowermost position and also shows the corresponding position for the wire-feeding guide 20 and at this time the stem 52 thereof extends through the workholder and wire-feeding arms 57 and 58 are located above the upper end of the workholder. When the workholder is moved upwardly by the gear 56 the wire-feeding arms 57 and 58 travel relatively downwardly through the workpiece and by the time that the workholder has reached the end of its upward travel, the arms 57 and 58 will have moved into the clearance chamber 54 of the body 30 of the workholder. The oscillating movement which is imparted to the wire-feeding guide 20 at the end of the upward travel of the workholder causes a lateral arcuate swinging of the arms 57 and 58 in the clearance chamber 54.

Figure 5:
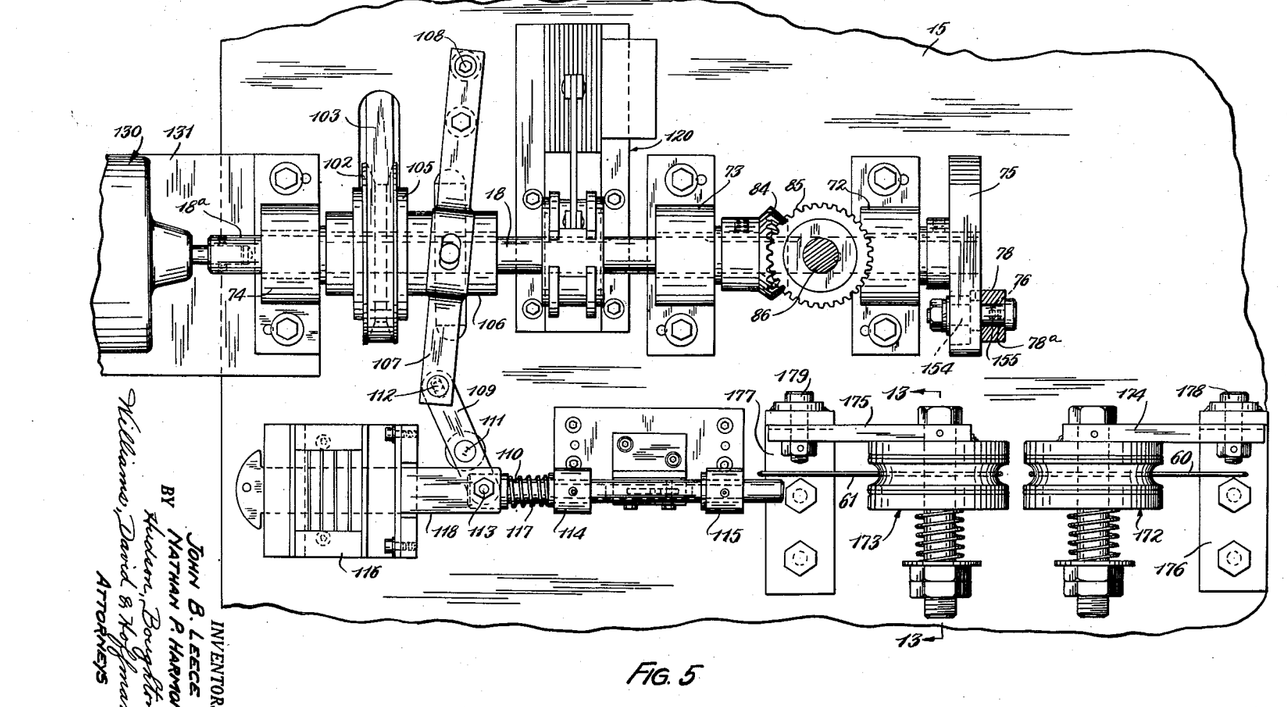
Fig. 5 is a partial horizontal section taken substantially on section line 5—5 of Figs. 1 and 4, and showing the main drive shaft and associated mechanism of the machine on a larger scale.

For supplying the motion needed to actuate the workholder 19 and the wire-feeding guide 20 with the above-mentioned reciprocating and oscillating movements, the machine 10 is provided with the previously mentioned main drive shaft 18. This drive shaft is journalled in a plurality of aligned bearings 72, 73 and 74 (see Fig. 5) which are mounted on the plate 15 of the frame 11. A portion of the drive shaft 18 extends beyond the bearing 72 and has a crank or eccentric 75 keyed thereon. The crank 75 carries a crankpin 76 from which the gear 56 is adapted to be oscillated by means of a connecting link 77. The lower end of this link is pivotally connected with the crankpin 76 by means of a link portion 78 having a slot 78a therein in which the crankpin engages. The purpose of the slot 78a will be explained hereinafter.

The upper end of the link 77 is pivotally connected with the gear 56 by the pivot pin 79 of the latter. The gear 56 is mounted on and keyed to an auxiliary shaft 80 which extends in a lateral direction and is located adjacent the underside of the plate 17. The auxiliary shaft 80 is journalled in suitable bearings 81 and 82, of which the bearing 82 is secured to the right-hand end of the frame 11, and the bearing 81 is mounted on the underside of the plate 17 in depending relation thereto. A handwheel 80a is mounted in fixed relation on the outer end of the shaft 80 and serves a purpose which will be subsequently explained herein.

At a point between the bearings 72 and 73 the main shaft 18 has a bevel gear 84 mounted thereon and keyed thereto. A bevel gear 85 meshing with the gear 84 is keyed to a vertical shaft 86 which is mounted in an upright bearing sleeve 87. The bearing sleeve is mounted on the plate 16 so as to extend through an opening thereof and can be attached to the plate by the welding indicated at 88. The upright shaft 86 is journalled in the bearing sleeve 87 by means of the antifriction bearings 89 and 90.

The oscillating movement for the wire-feeding guide 20 is obtained from the vertical shaft 86 and for this purpose a crank or eccentric 91 is mounted on the upper end of this shaft and carries a crankpin 92. The gear section 71 is operably connected with the crankpin 92 by a link 93. One end of the link 93 is pivoted on the crankpin 92 and its other end is provided with a slot 94 and is connected with the gear sector 71 by means of a pivot pin 95 which is carried by the gear sector and engages in this slot. The purpose of the slot 94 will be explained hereinafter. The gear sector 71 is adapted for swinging movement by being mounted on a pivot shaft 96 which is fixed in the upper end of an upright post 97. The post 97 is suitably mounted on the plate 16 as by means of the welding indicated at 98.

The main drive shaft 18 can be driven from an electric motor 99 through a reduction gear 100. The motor and reduction gear are suitably mounted on the plate 14 of the frame 11. The output shaft of the reduction gear 100 has a pulley 101 thereon with which a pulley 102 of the drive shaft 18 is connected by means of a belt 103 extending around these pulleys. The electric motor 99 operates continuously when energized by closing a motor control switch 104. This switch can be mounted on the frame 11 at any suitable point and includes a starting button 104a and a stop button 104b. The pulley 102 is adapted to be drivingly connected with the shaft 18 by means of a conventional clutch, such as the disk clutch 105 here shown.

The clutch 105 includes a clutch sleeve 106 which is mounted on the shaft 18 and shiftable axially thereof by means of a clutch actuating lever 107. One end of the lever 107 is mounted on a fixed pivot 108 and the other end thereof is adapted to be swung axially of the shaft 18 by a lever 109 which transmits such swinging movement to the clutch lever from a clutch actuating shaft 110. The lever 109 is mounted on a fixed pivot 111 and has its opposite ends pivotally connected with the clutch lever 107 and the clutch actuating shaft 110 respectively, by the pivot pins 112 and 113. The clutch actuating shaft 110 is mounted for axial sliding movement in a pair of spaced bearings 114 and 115 which, in turn, are mounted on the plate 15.

Figures 2, 12:
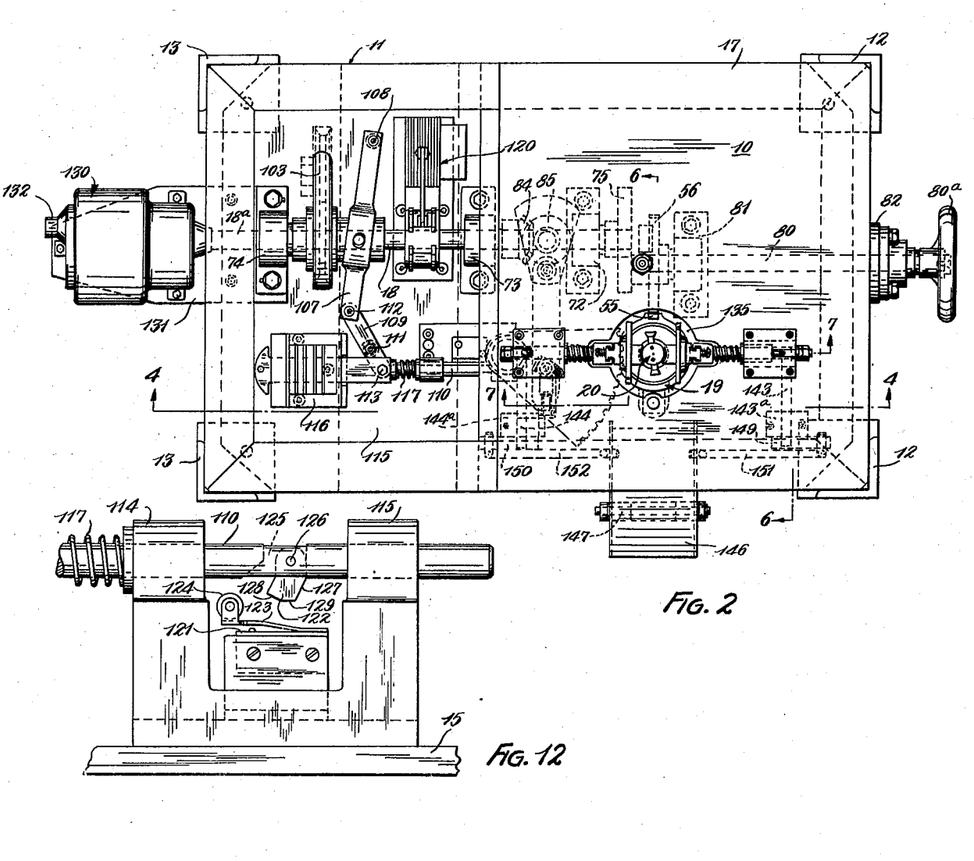
Fig. 2 is a plan view of the machine.
Fig. 12 is a fragmentary front elevation corresponding with a portion of Fig. 4 and presenting a larger scale showing of the brake energizing switch and the means for actuating the same from the clutch control shaft.

Clutch actuating movement is imparted to the shaft 110 in one direction by a solenoid 116 and in the opposite direction by a compression spring 117. The solenoid 116 is mounted on the plate 15 and has an armature 118 movable therein and with which one end of the clutch actuating shaft 110 is connected. The spring 117 is located on the shaft 110 at a point between the bearing 114 and the adjacent end of the armature 118 of the solenoid 116. When the solenoid 116 is energized the armature 118 thereof is shifted to the position shown in Figs. 2, 4 and 5, thereby causing the lever 109 to swing the clutch lever 107 toward the left and shift the clutch sleeve 106 in a direction to engage the clutch 105 and cause the shaft 18 to be driven. When the solenoid 116 is deenergized the spring 117 shifts the armature 118 in the opposite direction and causes the clutch lever 107 to disengage the clutch 105.

When the solenoid 116 has been deenergized to cause disengagement of the clutch 105, it is desirable to quickly bring the drive shaft 18 and the parts of the winding mechanism connected therewith to a stop. For this purpose the machine 10 is provided with an electromagnetic brake 120 of a conventional form. This brake is mounted on the plate 15 and cooperates with the shaft 18 through suitable friction means to cause stopping thereof when the brake is electrically energized. Energization of the brake in timed relation to disengagement of the clutch 105 is accomplished by the closing of a brake energizing switch 121 (see Figs. 4 and 12).

The switch 121 is located adjacent the clutch control shaft 110 and is adapted to be closed by the action of a trigger or latch 122 carried by this shaft. The switch 121 is normally open but is adapted to be closed by downward movement of a resilient arm 123 which carries a roller 124. The trigger 122 is located in a slot 125 of the clutch control shaft 110 and is pivotally connected with this shaft by means of a transverse pivot pin 126. The shape of the trigger 122 and of the slot 125 are such that during movement of the clutch control shaft 110 toward the left by the spring 117, the trigger will be effective to cause the closing of the switch 121, but during movement of the shaft toward the right by energization of the solenoid 116, the trigger will swing idly on the pivot pin 126 and will move over the roller 124 without causing closing of the switch.

In order to accomplish the functioning just explained for the trigger 122, it will be observed that the trigger has an inclined portion 127 which engages the roller 124 during the return or right-hand movement of the shaft 110 and causes the above-mentioned idle swinging of the trigger. The trigger also has an inclined face 128 which engages the roller during movement of the shaft toward the left and since the shape of the slot prevents any idle movement of the trigger during the shifting of the shaft in this direction, the face 128 will transmit thrust to the roller 124 and will cause downward springing of the resilient arm 123 to close the switch 121.

The trigger 122 is also provided with a flat surface 129 over which the roller 124 must pass during the clutch disengaging movement of the shaft 110 toward the left. The passage of the roller over the surface 129 occurs immediately following the closing of the brake energizing switch 121 by the inclined surface 128. The surface 129 constitutes a dwell portion of the trigger which holds the switch 121 closed for a short interval of time so as to maintain the braking action of the electromagnetic brake 120 effective on the shaft 18 for this time interval. As soon as the roller 124 traverses the dwell surface 129 and moves up the inclined surface 127, the switch 121 will open to deenergize the electromagnetic brake 120.

The machine 10 includes mechanism for controlling the coil winding operation and an important part of this control mechanism is represented by the combined revolution counter and control switch device 130 which is hereinafter referred to merely as a revolution counter. This device serves to count the number of turns of wire which are being wound around the pole members 23 and 24 in forming the coils 25 and 26 and to cause an automatic stopping of the machine when the desired number of turns has been wound on the pole members. The revolution counter 130 is here shown as being connected with an extension 18a of the main shaft 18 which extends outwardly to the left beyond the bearing 74. The counter 130 can be suitably supported as by being mounted on a bracket or plate 131 projecting laterally from the frame 11.

The revolution counter 130 is a conventional form of combined revolution counter and electric switch device and embodies mechanism which is adapted to be set for the desired number of turns to be wound in the coils 25 and 26 as by means of a manually adjustable knob 132. The counter also includes electric switch mechanism for energizing the solenoid 116 and for automatically deenergizing this solenoid when the desired number of turns has been wound into the coils 25 and 26.

The control mechanism of the machine 10 also includes a push-button switch 133 which is mounted in a suitable location, such as on one of the legs 12 and at the front of the machine, and which is electrically connected with the revolution counter 130. The winding operation is started by the operator pressing the push-button of the switch 133 to thereby energize the revolution counter 130 and render the same effective to count the turns of the coils to be wound and also causing the counter to close the energizing circuit for the solenoid 116 for engaging the clutch 105. The operator can then release the button of the switch 133 since the solenoid 116 will be maintained energized until the desired number of turns has been wound to form the coils 25 and 26. When the number of turns in the coils reaches the value for which the counter 130 has been set, the counter automatically deenergizes the solenoid 116 to permit the spring 117 to disengage the clutch 105 as explained above.

The plate 17 provided at the top of the frame 11 forms a cover extending over a substantial portion of the mechanism and also provides a support for various parts of the apparatus. This plate also serves the important purpose of forming a worktable at the top of the machine for the use of the operator and on which a number of the workpieces 21 can be placed before and after the coils 25 and 26 have been wound thereon. The plate 17 has an opening 135 therein located over the workholder 19 and which is of a size and shape to permit the workholder to pass therethrough. When the workholder is at the uppermost point of its reciprocating travel it extends above the plate 17 and occupies substantially the position shown in Fig. 7 which represents the loading and unloading station for the workholder. The opening 135 is here shown as being a generally circular opening, but has substantially oppositely extending extension recesses 135a which provide clearance for the laterally projecting screws 44 of the side plates 33 and 34 of the workholder.

The actuators 47 and 48, which have been referred to above in connection with the laterally movable fork members 39 and 40 of the workholder 19, are located above the plate 17 for cooperation with the heads 39a and 40a of these fork members when the workholder is at the loading and unloading station. The actuators 47 and 48 are mounted on the plate 17 and, for this purpose, are provided with outwardly extending stem or shaft portions 47b and 48b which are slidable in bushings 136 carried by bearing blocks 137 and 138. These bearing blocks can be substantially T-shaped as here shown and can be mounted on the plate 17 by having the stem portions thereof extend downwardly through openings 139 of the plate. The stems 47b and 48b of the actuators 47 and 48 are mounted in the head portions of the bearing blocks which are located above the plate 17 and these stems are provided with slots 140 in which the upper ends of a pair of actuating levers 141 and 142 engage.

The levers 141 and 142 are themselves located in vertical slots 137a and 138a of the bearing block 137 and 138 and are carried by forwardly extending auxiliary shafts 143 and 144. These auxiliary shafts are rockably supported in part by the portions of the bearing blocks 137 and 138 which extend below the plate 17 and in part by a second pair of bearing blocks 143a and 144a which are mounted on the underside of the plate 17. The actuators 47 and 48 are normally urged toward each other, that is to say to an inwardly extended relation from the bearing blocks 137 and 138, by compression springs 145 disposed around the stems 47b and 48b. When the actuators are in this extended relation they are in proper position for the dovetail slots 47a and 48a thereof to receive the heads 39a and 40a of the fork members 39 and 40 when the workholder moves upwardly to the loading and unloading station.

The outward movement of the actuators 47 and 48 for retracting the fork members 39 and 40 to release the workpiece 21 can be transmitted thereto through the auxiliarly shafts 143, 144 and the levers 141, 142 from any suitable operating device. In this instance the machine 10 is provided with a movable pedal 146 for this purpose which is adapted to be actuated by a foot of the operator. The pedal 146 is mounted on pivot means 147 which is carried by a bracket extension 148 of the frame 11 and is operably connected with the auxiliarly shafts 143, 144 by levers 149, 150 mounted on the front ends of these shafts and links 151 and 152 connecting the outer ends of these levers with the pedal.

When the pedal 146 is depressed by the foot of the operator, the levers 141 and 142 will be swung in an outward direction relative to the opening 135 of the plate 17, thereby imparting a corresponding outward movement to the actuators 47 and 48 and to the fork members 39 and 40 connected therewith by the cooperating dovetail slot and head elements 47a, 39a and 48a, 40a. While the fork members are held in this retracted position the workpiece 21 having the coils 25 and 26 wound thereon is removed from the workholder 19 and another workpiece is substituted in its place. Release of the pedal 146 permits the springs 145 to impart inward movement of the actuators, thereby shifting the fork members 39 and 40 inwardly to embrace the workpiece 21 and retain the same in position in the workholder.

It will be understood that during the reciprocating movement imparted to the workholder during the coil winding operation, the workholder repeatedly moves into and out of the loading and unloading station and each time that the workholder moves to this station the dovetail elements of the fork members and the actuators come into interfitting engagement in the relation shown in Fig. 7, and upon movement of the workholder away from this station these elements move out of such engagement. So long as the pedal 146 is not depressed by the operator, such movement of the dovetail elements into and out of engagement takes place as an idle movement and has no effect on the action of the fork members 39 and 40 in locking the workpiece 21 in place in the workholder.

As previously mentioned herein, the reciprocating movement of the workholder 19 and the oscillating movement of the wire-feeding guide 20 take place alternately and each of these movements is interrupted while the other is taking place. The occurrence of these movements in this sequential relation results from the provision of lost-motion operating connections in the mechanisms which impart the reciprocating and oscillating movements to the workholder and the wire-feeding guide, and which mechanisms have been described above. As pointed out in the descriptions of these mechanisms, the link 77 has a slot 78a therein and the link 93 has a slot 94 therein. The cooperation of these slots with the pins 76 and 95 engaging therein forms the lost-motion connections just referred to. The pin 76 has a stem portion 154 which is mounted in fixed relation in the crank 75 (see Fig. 5) and the pin carries a roller 155 which operates in the slot 78a. Similarly, the pin 95 has a stem portion 156 which is mounted in fixed relation in the gear sector 71 (see Fig. 10) and the pin carries a roller 157 which operates in the slot 94.

The workholder 19 is shown in Fig. 6 at the lower end of its reciprocating travel and is about to be moved upwardly by the gear 56. At this time the pin 76 of the crank 75 is at the lower end of the slot 78a of the link 77. Since the crank 75 rotates in a counter-clockwise direction, as seen in Fig. 6, the pin 76 will immediately be effective to exert a downward pull on the link 77 to thereby impart clockwise arcuate movement to the gear 56 for lifting the workholder 19. By the time that the crank 75 has traveled through an angular distance of approximately 90 degrees the gear 56 will have lifted the workholder 19 to its uppermost position, that is to say, to the loading and unloading station as shown in Fig. 7 and the pin 76 will then be at its lower dead-center position.

Counter-clockwise rotation of the crank 75 thereafter takes place as an idle movement during which the pin 76 shifts upwardly in the slot 78a without imparting axial movement to the link 77. When the pin 76 reaches the upper end of the slot 78a it again imparts movement to the link 77, but in an upward direction which causes counter-clockwise arcuate movement of the gear 56 for moving the workholder downwardly. When the pin 76 passes over its upper dead-center position it again has an idle travel in the slot 78a which continues until the pin reaches the lower end of the slot which is the position shown in Fig. 6. The idle travel of the pin 76 in the slot 78a at two points during each revolution of the crank 75 represents the two dwell periods during which the reciprocating movement of the workholder 19 is interrupted to permit oscillation of the wire-feeding guide 20 to take place.

Figure 14:
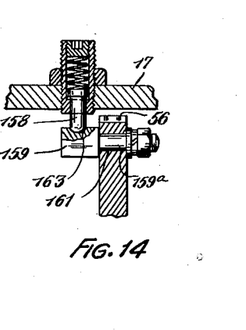
Fig. 14 is a sectional detail view taken through a detent device as indicated by section line 14—14 of Fig. 6.

Since the movement of the workholder 19 to the loading and unloading station at the upper end of its vertical travel is immediately followed by an idle downward movement of the pin 76 in the slot 78a, the link 77 will be temporarily ineffective for holding the workholder in its upper position. It is therefore necessary to provide means for temporarily retaining the workholder in its upper position while this idle travel of the pin 76 is taking place. For this purpose the plate 17 is provided with a spring pressed detent or latch 158 and the gear 56 is provided with a pair of spaced holding members 159 and 160 for engagement with such detent. As shown in Figs. 6 and 14 the holding members 159 and 160 are in the form of blocks adapted to be clamped in fixed relation on the gear 56 by clamping stems 159a and 160a extending through arcuate slots 161 and 162 of this gear. The block portion of each of these holding members is provided with a locking recess 163 adapted to receive the end of the detent 158 for releasably holding the gear 56 in a position with one of such holding members in cooperation with the detent.

When the workholder 19 is in its lower position as shown in Fig. 6, the holding member 160 is in engagement with the detent 158 but when the pin 76 of the crank 75 exerts a downward pull on the link 77 the clockwise rotation imparted to the gear 56 disengages the holding member 159 from the detent and brings the holding member 160 into engagement with the detent. The engagement of the holding member 160 with the detent 158 maintains the workholder at the loading and unloading station until the idle travel between the pin 76 and the slot 78a has taken place and the pin begins to impart an upward thrust to the link 77. Such upward thrust of the link imparts a counter-clockwise movement to the gear 56 which disengages the holding member 160 from the detent and returns the holding member 159 into engagement with the detent. The arcuate slots 161 and 162 of the gear 56 provide for adjustment of the relative positions of the holding members 159 and 160 so that the holding function performed by the detent 158 as just explained above can be synchronized with respect to the movements of the other parts of the mechanism.

Figure 9:
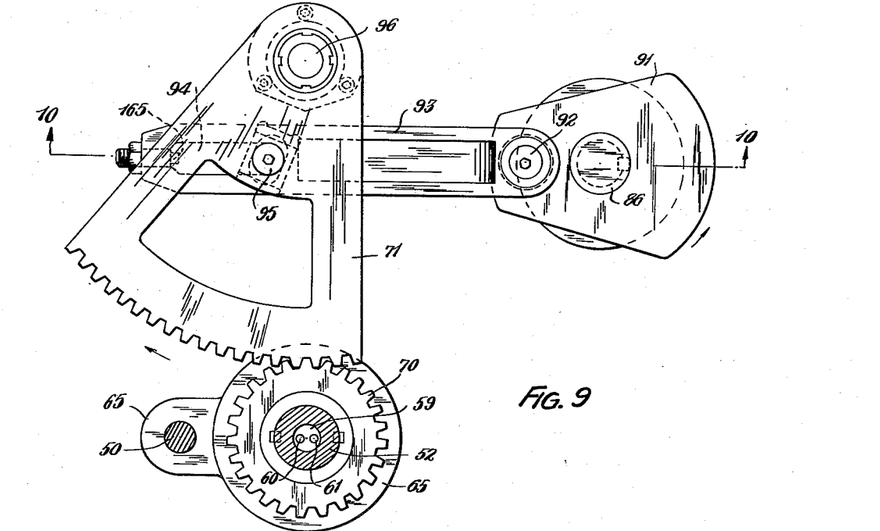
Fig. 9 is a fragmentary horizontal section taken substantially on section line 9—9 of Figs. 3 and 6 and further illustrating the mechanism for causing the oscillating movement of the wire-feeding guide.

In Figs. 3 and 6 the actuating mechanism for the workholder 19 is shown in the position at which the upward travel of the workholder is about to begin. As previously mentioned herein, the oscillating movement of the wire-feeding guide 20 is interrupted during the reciprocating travel of the workholder. This is accomplished by the lost-motion connection formed by the pin 95 and the above-mentioned slot 94 of the link 93. Fig. 9 shows the position of the link 93, the crankpin 92 and the gear sector 71 corresponding with the position shown in Figs. 3 and 6 for the link 77 and the crankpin 76. For this position of the crankpin 92 and the link 93, the pin 95 of the gear sector 71 is at one end of the slot 94 and since the crank 91 is being rotated in a counter-clockwise direction simultaneously with the counter-clockwise rotation of the crank 75, the pin 95 is about to begin its idle travel along the slot 94.

For approximately 90 degrees of counter-clockwise rotation of the crank 91, as seen in Fig. 9, the crankpin 92 will exert a pull on the link 93 but the slot 94 prevents such pull from being applied to the pin 95 of the gear sector 71. During this 90 degree counter-clockwise idle rotation of the crank 91 the crank 75 is exerting an effective pull on the link 77, as explained above, for lifting the workholder 19 through its upward stroke. By the time that this upward stroke of the workholder is completed the lost-motion represented by the slot 94 will have been taken up and the end of the slot 94 coming into engagement with the pin 95 will then enable the crank 91 to impart swinging movement to the gear sector 71. The outer end of the link 93 is preferably provided with an adjustable stop 165 which extends into the slot 94 for engagement with the pin 95.

The counter-clockwise swinging movement thus imparted to the gear sector 71 rotates the stem 52 of the wire-feeding guide 20 in a clockwise direction causing the guide arms 57 and 58 to be swung about the path of the reciprocating movement of the workholder as an axis and through an arcuate path extending across the lower sides of the pole members 23 and 24. Since the workholder at this time is in its upper position, that is at the loading and unloading station, this arcuate swinging movement of the arms 57 and 58 will take place in the clearance chamber 54 of the workholder. This swinging of the guide arms 57 and 58 winds the wires 60 and 61 across the lower side faces of the pole members 23 and 24 and at the end of such swinging movement these guide arms will occupy substantially the position shown in Figs. 7 and 11.

At the completion of this clockwise swinging of the guide arms 57 and 58 the workholder 19 is moved back to its lower position shown in Fig. 6 and while this is taking place another idle travel of the pin 95 in the slot 94 takes place which permits the wire-feeding guide 20 to remain stationary. Such downward movement of the workholder causes the guide arms 57 and 58 to pass relatively upwardly through the slots 22a of the frame opening 22 of the workpiece 21 thereby winding the wires 60 and 61 upwardly around the hook portions of the pole members 23 and 24 and thus returning the guide arms to their relative position above the workpiece in which they are shown in Fig. 6. In Figs. 7 and 11 the guide arms 57 and 58 are shown in the position in which they are about to begin this upward relative travel through the frame opening of the workpiece. From the foregoing description of the alternately interrupted sequential reciprocating and oscillating movements of the workholder and the wire-feeding guide it will be seen that the guide arms 57 and 58 accomplish what can be conveniently referred to as a step-by-step relative movement around the respective pole members 23 and 24 by which successive turns of the wires 60 and 61 are wrapped around these pole members.

Figures 10, 15:
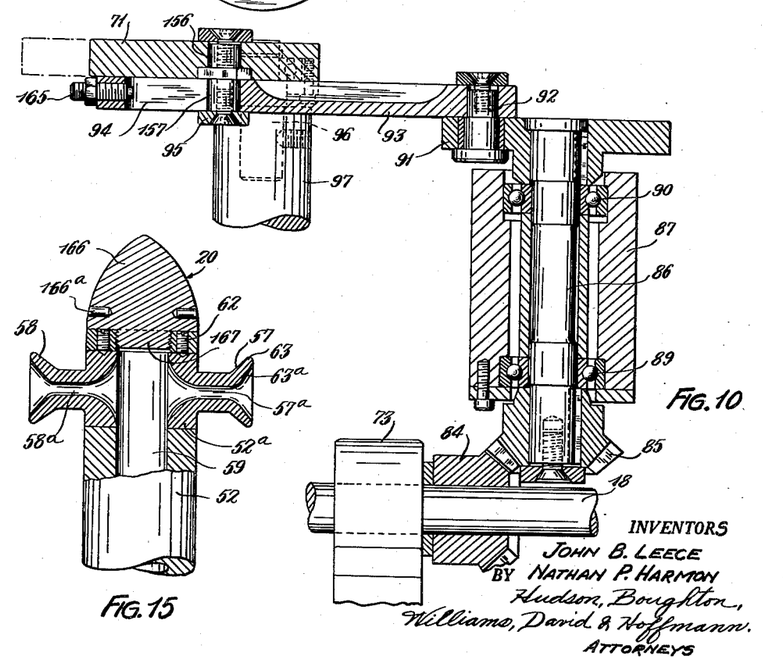
Fig. 10 is a partial vertical section taken through the guide oscillating mechanism, as indicated by section line 10—10 of Fig. 9.
Fig. 15 is a fragmentary detail view partly in vertical section further illustrating the upper end portion of the wire-feeding guide.

To prevent interference between the upper end of the stem 52 of the wire-feeding guide 20 with turns of wire previously wound on the pole members 23 and 24, the upper end of this stem is preferably provided with a tapered or bullet-nosed cap 166. As shown in Fig. 15 this cap can be mounted on the stem 52 by being provided with a threaded projection 167 which is adapted to be screwed into a threaded portion provided at the upper end of the passage 59. If desired, the cap 166 can be provided with suitably located holes 166a for the application of a spanner wrench, or the like thereto. This tapered cap will apply lateral thrust to turns of wire which overlap the frame opening 22 of the workpiece 21 and will tend to push these turns toward an out-of-the-way position which will not interfere with the passage of the wire-feeding guide through the workpiece. As the result of this lateral pushing of the wire turns by the cap 166 the coils 25 and 26 may assume a partially curved or bowed shape as shown in Fig. 16.

Figure 1:
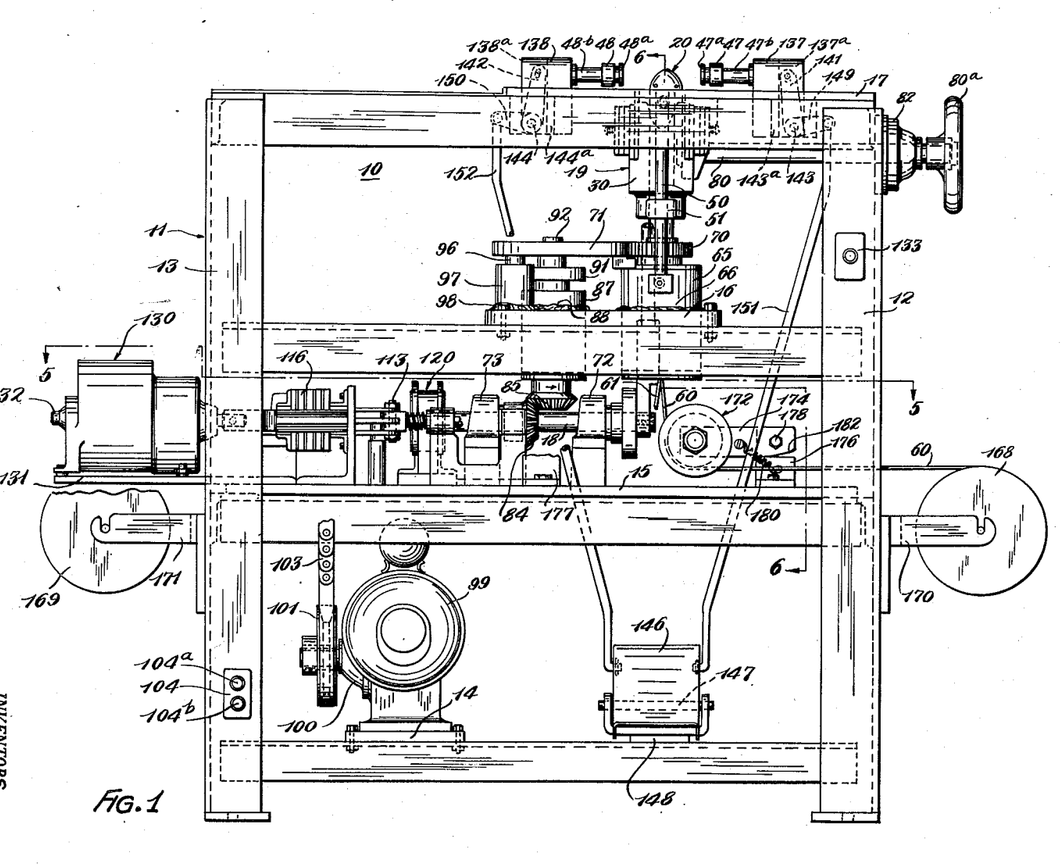
Fig. 1 is a front elevation of a coil winding machine embodying the present invention.

The wire strands 60 and 61 for forming the coils 25 and 26 can be supplied to the wire-feeding guide 20 from suitably located spools 168 and 169 carrying a supply of this wire. In this instance these spools are shown as being rotatably supported on brackets 170 and 171 (see Fig. 1) projecting from the ends of the frame 11. In passing from the spools 168 and 169 to the wire-feeding guide 20, the strands 60 and 61 extend around grooved rollers 172 and 173 of a pair of tension arms 174 and 175. The tension arms 174 and 175 are pivotally mounted on the frame 11 by means of brackets 176 and 177 to which the arms are connected by pivot pins 178 and 179. The wires 60 and 61 extend around the rollers 172 and 173 in such a direction as to apply a pull or lifting force to the tension arms 174 and 175. Tension springs 180 and 181 exert a pull on the arms 174 and 175 in a downward direction so as to oppose such upward swinging of the arms and maintain the wires under tension. The upward swinging movement of the tension arms 174 and 175 is limited by the inclined stop faces 182 provided on these arms (see Fig. 4) and which are located so as to come into seating engagement with portions of the brackets 176 and 177.

Figure 13:
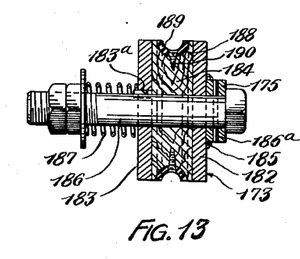
Fig. 13 is a vertical section taken through one of the wire tensioning devices as indicated by section line 13—13 of Fig. 5.

The tension on the wires 60 and 61 is also maintained, in part, by applying a braking force or drag to the rollers 172 and 173 of the tension arms 174 and 175. This is accomplished by constructing the rollers of relatively movable sections 182, 183 and 184, as shown in Fig. 13, of which the sections 182 and 183 are end sections or disks which are held in non-rotatable relation and the section 184 is a center section which is rotatable relative to these end sections by the action of the wire thereon. The end section 182 can be maintained stationary by being welded to the tension arm, as indicated at 185, and the end section 183 can be fixed on the shaft 186 by a key 183a which permits this section to be shifted axially of the shaft. The shaft 186 is held against rotation in the tension arm by the pin 186a. The center section 184 of the roller can be formed of wood, plastic or any other suitable material and has its side faces in frictional engagement with the adjacent faces of the end sections 182 and 183. A compression spring 187 disposed around the shaft 186 acts to press the sections 182, 183 and 184 together so that rotation of the center section 184 by the wire passing thereover will be resisted by the frictional drag provided between the center section and the end sections.

As shown in Fig. 13 of the drawings, the center section 184 may have a peripheral groove 188 extending therearound and forming a guide channel for accommodating the wire. This guide channel is preferably lined with a relatively soft material 189 which will not scratch or mar the enamel-insulated surface of the wire, such as soft vulcanized rubber. Such a lining for the groove 188 can be formed by a piece of rubber tube split longitudinally so as to have a substantially semicircular cross-section. This transversely curved liner can be secured in the peripheral groove of the center section 184 as by screws 190 extending therethrough into such center section. When the center section is made of wood or other nonmetallic material, these screws can be wood screws, as shown in the drawings.

The operation of the improved coil winding machine 10 has already been partially explained herein but will be summarized in the following paragraphs. To place the machine in readiness for performing the coil winding operation, the operator presses the starting button 104a of the motor switch 104, thereby starting the driving motor 99 which thereafter runs continuously while the machine is being used. The operator also adjusts the revolution counter 130 by means of the adjusting knob 132 to set this device for the number of turns desired to be wound in the coils 25 and 26. The operator then takes a position in front of the machine such that the pedal 146 will be conveniently accessible to one foot and the handwheel 80a and the starting switch 133 will be conveniently accessible to one hand. Assuming that the workholder 19 is in its uppermost position, that is at the loading and unloading station as shown in Fig. 7, the operator depresses the pedal 146, causing the actuators 47 and 48 to retract or expand the fork members 39 and 40 of the workholder. The operator thereupon inserts one of the frame members 21 in the cavity of the workholder as a workpiece and releases the pedal 146, thereby allowing the fork members 39 and 40 to move inwardly into embracing relation with the workpiece and lock the same in position in the cavity of the workholder.

In the event that the workholder 19 happens to be at a point below the table 17 instead of at the loading and unloading station, the operator manually rotates the handwheel 80a in a clockwise direction, as seen in Fig. 3, to actuate the gear 56 in a direction to lift the workholder up to the loading and unloading station. When this has been accomplished, the operator depresses the pedal 146 to expand the fork members of the workholder to receive the workpiece, as just explained above.

The leading ends of the wires 60 and 61, which have been previously threaded through the stem 52 and the guide arms 57 and 58 of the wire-feeding guide 20, are then applied to the anchor pins 191 and 192 of the workholder as shown in Figs. 6 and 11 preparatory to starting the winding operation. The ends of the wires 60 and 61 can be simply looped or bent around the anchor pins and these portions of the wires will subsequently form one pair of leads for the coils such as the leads 25a and 26b. The operator then presses the starting switch 133 which energizes the revolution counter 130 causing the switch means of the latter to become set and to also energize the solenoid 116. The energization of the solenoid 116 causes the clutch 105 to be engaged whereupon the shaft 18 supplies motion to the mechanisms which reciprocate the workholder 19 and oscillate the wire-feeding guide 20 with the timed and sequentially interrupted relative reciprocating and relative oscillating movements explained above. These relative movements cause the above-mentioned step-by-step progressive winding movement of the guide arms 57 and 58 around the pole members 23 and 24 to wind the turns of wire thereon to form the coils 25 and 26.

When the desired number of turns for which the counter 130 is set has been wound on the pole members 23 and 24, the switch means of the counter is automatically tripped and causes deenergization of the solenoid 116. The spring 117 thereupon causes disengagement of the clutch 105 and stops the movement of the workholder 19 and of the wire-feeding guide 20. The disengagement of the clutch 105 is accompanied by the above explained closing of the brake energizing switch 121 by the trigger 122 of the clutch control shaft 110, thereby rendering the electromagnetic brake 120 effective for a short interval to stop the drive shaft 18 and the mechanisms which actuate the workholder and the wire-feeding guide.

Usually the workholder will come to a stop at the loading and unloading station but if it comes to a stop a point below the table 17, the operator rotates the handwheel 80a to drive the gear 56 in a clockwise direction to lift the workholder up to the loading and unloading station. The movement of the workholder up to the loading and unloading station causes the heads 39a and 40a of the fork members 39 and 40 to engage in the dovetail slots of the actuators 47 and 48, as explained above. The operator then depresses the pedal 146 to expand the workholder and release the workpiece 21 on which the coils 25 and 26 have just been wound. The operator grasps the workpiece and lifts the same out of the cavity of the workholder and in so doing exerts an upward pull on the wires 60 and 61 so as to withdraw an appropriate amount of wire out of the guide arms 57 and 58. The operator then cuts the wires at a point near the coils 25 and 26 so as to leave the leads 25b and 26a projecting from the coils. The wire which has been withdrawn from the guide arms 57 and 58 also provides stock for attachment to the pins 191 and 192 of the workholder for starting the winding operation on the next workpiece to be inserted into the workholder. The above described procedure is repeated for the workpieces which are successively inserted into and removed from the workholder.

From the foregoing description and the accompanying drawings it will now be readily understood that this invention provides an improved wire coil winding machine by which electric coils can be wound on pole members in a more rapid and satisfactory manner than has heretofore been possible. It will now also be recognized that this invention provides a novel machine by which field coils or the like can be rapidly and satisfactorily wound on pole members projecting into an opening of a magnet frame.

Although the improved coil winding machine of the present invention has been disclosed herein to a detailed extent it will be understood, of course, that the invention is not to be regarded as being limited correspondingly in scope, but includes all changes and modifications coming within the terms of the claims hereof.

Having thus described our invention, we claim:

1. In a coil winding machine of the character described, a workholder for supporting a substantially annular magnet frame of the type having an opening therein and an isolated pole member projecting into said opening, said workholder being reciprocably movable along a path substantially coincident with the central axis of said opening, a wire-feeding guide adapted to pass through said opening, said guide having a stem mounted for rocking movement substantially on said axis and an arm carried by said stem and adapted to be oscillated transversely to said path by said rocking movement, said workholder being hollow at one end for receiving said magnet frame therein and at its other end having hollow bearing means slidable on said stem, a first means for imparting said reciprocating movement to said workholder, and a second means for imparting said rocking movement to said stem, said first means and said second means being effective to produce said reciprocating and rocking movements alternately 2. In a coil winding machine, a supporting structure having a loading and unloading station thereon, a workholder adapted to receive a core member and comprising sections which are relatively movable for retaining or releasing said core member, means mounting said workholder for reciprocating movement toward and away from said loading and unloading station, a first means for imparting such reciprocating movement to said workholder, an oscillatable wire-feeding means, a second means for imparting oscillating movement to said wire-feeding means, said first means and said second means being effective to produce said reciprocating movement of said workholder and said oscillating movement of said wire-feeding means alternately for causing the latter to wind wire around said core member during said movements, and actuating means on said supporting structure and located at said station and being operable to cause relative opening of said sections for releasing the wound core member, said actuating means and one of the sections of said workholder having dovetail portions adapted for interfitting engagement upon movement of said workholder to said station.

3. In a coil winding machine, a supporting structure having a loading and unloading station thereon, a workholder adapted to receive a core member and having oppositely movable work retaining members, spring means for urging said retaining members into holding cooperation with said core member, means mounting said workholder for back-and-forth movement to and from said loading and unloading station, an oscillatable wire-feeding means in cooperating winding relation to said workholder, means operable to impart said back-and-forth movement to said workholder and an oscillating movement to said wire-feeding means alternately for causing the latter to wind wire around said core member, dovetail elements connected with said retaining members, a pair of spaced actuating members on said supporting structure and located at said station, and complemental dovetail elements carried by said actuating members and engageable with the first-mentioned dovetail elements upon movement of said workholder to said station.

4. In a coil winding machine, a supporting structure having a loading and unloading station thereon, a workholder adapted to receive a core member and having oppositely movable work retaining members, spring means for urging said retaining members into holding cooperation with said core member, means mounting said workholder for back-and-forth movement to and from said loading and unloading station, an oscillatable wire-feeding means in cooperating winding relation to said workholder, means operable to impart said back-and-forth movement to said workholder and an oscillating movement to said wire-feeding means alternately for causing the latter to wind wire around said core member, dovetail elements connected with said retaining members, a pair of spaced actuating members on said supporting structure and located at said station, complemental dovetail elements carried by said actuating members and engageable with the first-mentioned dovetail elements upon movement of said workholder to said station, and manually controlled means for causing operation of said actuating members.

5. In apparatus for winding wire on a core member, a workholder, means mounting said workholder for back-and-forth movement, a wire-feeding device, means mounting said feeding device for oscillating movement in timed relation to the back-and-forth movement of said workholder for winding the wire around said core member, a first means for imparting said oscillating movement to said feeding device, said workholder having retaining means thereon which is relatively movable for retaining or releasing said core member and spring means urging said retaining means toward its effective position, a loading and unloading station at one end of the path of said back-and-forth movement, a second means for moving said workholder along said path and to said station, said first means and said second means being effective for producing said oscillating movement of said feeding device and said back-and-forth movement of said workholder alternately, and actuating means located at said station and engageable with said retaining means, said actuating means being effective to actuate said retaining means in opposition to said spring means only when said workholder is at said station.

6. In apparatus for winding wire on a core member, a frame, a workholder adapted to receive the core member and having retaining means for retaining the core member therein and said retaining means being movable for releasing said core member, a table providing a work surface on said frame and having an opening of a size and shape for the passage of said workholder therethrough, a loading and unloading station on said table adjacent said opening, mechanism operable to cause wire to be wound into a coil on said core member and to move said workholder through said opening to said station, and actuating means on said table adapted to actuate said retaining means for releasing said core member when the workholder is at said station, said actuating means being movable in a direction extending transverse to the path of travel of said workholder and having a portion overhanging said opening for engagement with said retaining means.

7. In apparatus for winding wire on a core member, a frame, a workholder adapted to receive said core member, means mounting said workholder on said frame for a substantially vertical reciprocating movement, a wire-feeding device, means mounting said feeding device for oscillating movement in timed alternate relation and transversely to said reciprocating movement for winding the wire around said core member, means for imparting said oscillating movement to said feeding device, a table providing a work surface on said frame and having an opening of a size and shape for passage of said workholder therethrough, a loading and unloading station above said opening, means operable to impart said reciprocating movement to said workholder and to move the same to said station, said workholder having retaining means thereon which is movable to release said core member, and actuating means on said table and adapted to actuate said retaining means when said workholder is at said station, said actuating means comprising a member movable in a direction transverse to the path of travel of said workholder and overhanging said opening and cooperating portions carried by said member and said retaining means and forming a releasable operating connection therebetween when said workholder is at said station.

8. In apparatus for winding wire on a core member, a frame, a workholder adapted to receive said core member, means mounting said workholder on said frame for a substantially vertical reciprocating movement, a wire-feeding device, means mounting said feeding device for oscillating movement in timed alternate relation and transversely to said reciprocating movement for winding the wire around said core member, means for imparting said oscillating movement to said feeding device, a table on said frame and having an opening of a size and shape for passage of said workholder therethrough, a loading and unloading station above said opening, means operable to impart said reciprocating movement to said workholder and to move the same to said station, said workholder having fork members extending thereinto from opposite sides for retaining said core member therein and said fork members being retractable for releasing the workpiece, and actuators mounted on said table and operable to retract said fork members when the workholder is at said station.

9. In a coil winding machine of the character described, a substantially vertically disposed hollow workholder adapted to support a substantially annular magnet frame of the type having an opening therein and an isolated pole member projecting into said opening, said workholder being reciprocably movable along a vertical path substantially coincident with the central vertical axis of the magnet frame opening, a wire-feeding guide adapted to pass through said magnet frame opening, said guide comprising a substantially vertical hollow stem rockable on said axis and an arm carried by said stem and adapted to be oscillated thereby transversely to said path, means mounting said stem substantially on said vertical axis for such rocking movement, said workholder being open at its upper end for receiving a magnet frame therein and at its lower end having hollow bearing means slidable on said stem, a first means operable to impart a lifting and lowering reciprocating movement to said workholder, and a second means operable to impart said rocking movement to said stem, said first means and said second means being effective to produce said reciprocating and rocking movements alternately.

10. In a coil winding machine of the character described, a substantially vertically disposed hollow workholder adapted to support a substantially annular magnet frame of the type having an opening therein and an isolated pole member projecting into said opening, said workholder being reciprocably movable along a vertical path substantially coincident with the central vertical axis of the magnet frame opening, a wire-feeding guide adapted to pass through said magnet frame opening, said guide comprising a substantially vertical hollow stem rockable on said axis and an arm carried by said stem and adapted to be oscillated thereby transversely to said path, means mounting said stem substantially on said vertical axis for such rocking movement, said workholder being open at its upper end for receiving a magnet frame therein and at its lower end having hollow bearing means slidable on said stem, a first means operable to impart a lifting and lowering reciprocating movement to said workholder and comprising a rack connected with the workholder and a gear member meshing with said rack, and a second means operable to impart said rocking movement to said stem, said first means and said second means being effective to produce said reciprocating and rocking movements alternately.

11. In a coil winding machine of the character described, a workholder for supporting a substantially annular magnet frame of the type having an opening therein and a pair of isolated pole members projecting into said opening from opposite sides thereof, means mounting said workholder for reciprocating movement along a path substantially coincident with the central axis of said magnet frame opening, a wire-feeding guide adapted to pass through said opening, said guide having a stem mounted for rocking movement substantially on said axis and a pair of arms projecting from opposite sides of said stem and adapted to be oscillated transversely to said path by said rocking movement, said stem and arms having continuous guide passages therethrough for feeding wires from the arms for winding around said pole members, a first means for imparting said reciprocating movement to said workholder, and a second means for imparting said rocking movement to said stem, said first means and said second means being effective to produce said reciprocating and rocking movements alternately, said guide having a convexly rounded axially coverging tapered and pointed end located on said stem in advance of said arms and adapted to exert a spreading action on the turns of the coils wound on said pole members.

JOHN B. LEECE.
NATHAN P. HARMON.

REFERENCES CITED

The following references are of record in the file of this patent:

UNITED STATES PATENTS

| Number | Name | Date |
|---|---|---|
| 1,370,744 | Diehl | Mar. 8, 1921 |
| 1,407,033 | Huggins | Feb. 21, 1922 |
| 1,503,254 | Sippel et al. | July 29, 1924 |
| 1,977,828 | Laib et al. | Oct. 23, 1934 |
| 2,197,117 | Ammann et al. | Apr. 16, 1940 |
| 2,275,995 | Schneider | Mar. 10, 1942 |
| 2,304,520 | Wirtz et al. | Dec. 8, 1942 |
| 2,339,589 | Stearns | Jan. 18, 1944 |
| 2,381,750 | Hunsdorf | Aug. 7, 1945 |
| 2,445,937 | Carpenter | July 27, 1948 |